Sept. 8, 1964  R. A. BERNER  3,147,692
METHOD AND APPARATUS FOR MAKING PALLETS
Filed July 17, 1961  4 Sheets-Sheet 1

INVENTOR.
ROLAND A. BERNER
BY
ATTORNEYS

Sept. 8, 1964    R. A. BERNER    3,147,692
METHOD AND APPARATUS FOR MAKING PALLETS
Filed July 17, 1961    4 Sheets-Sheet 2

INVENTOR.
ROLAND A. BERNER
BY
ATTORNEYS

Sept. 8, 1964 R. A. BERNER 3,147,692
METHOD AND APPARATUS FOR MAKING PALLETS
Filed July 17, 1961 4 Sheets-Sheet 3
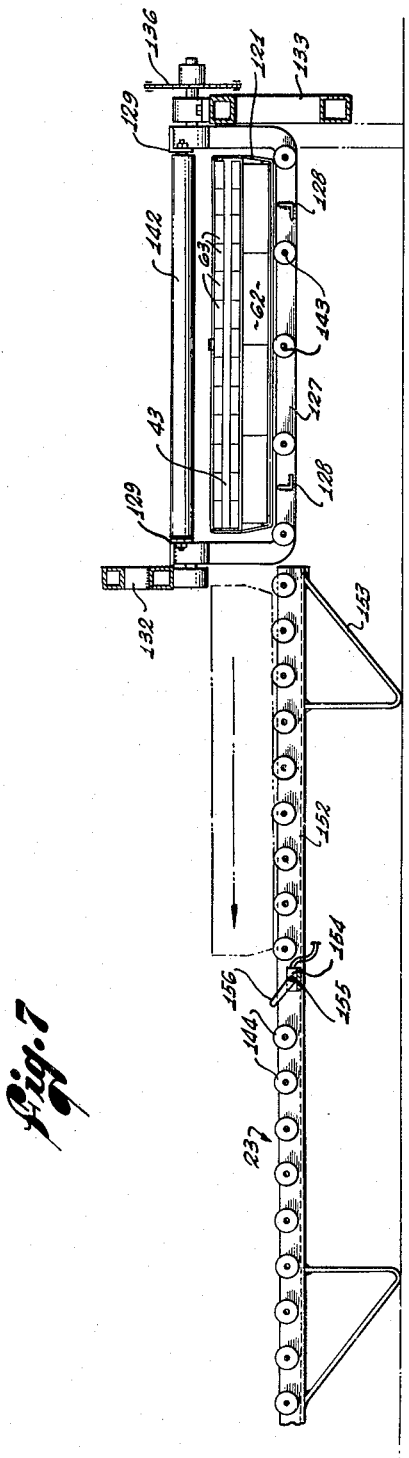
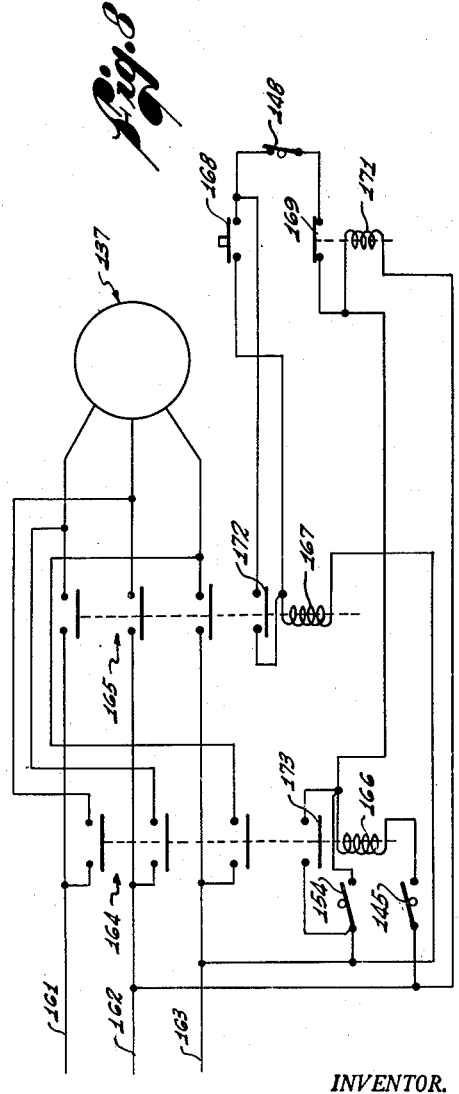
INVENTOR.
ROLAND A. BERNER
BY *Fulwider Mattingly Huntley*
ATTORNEYS

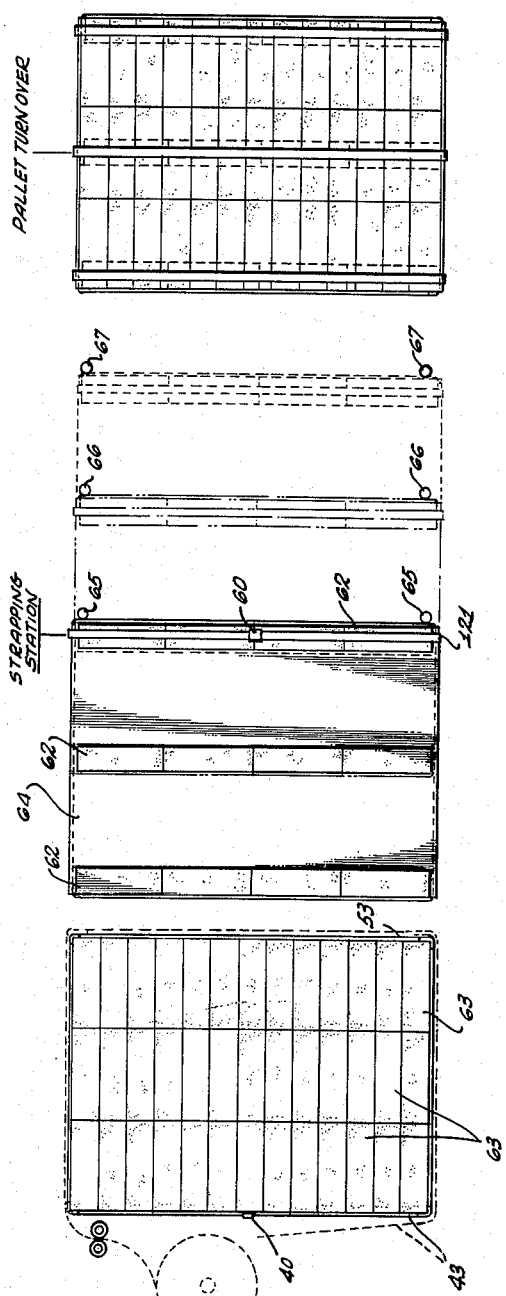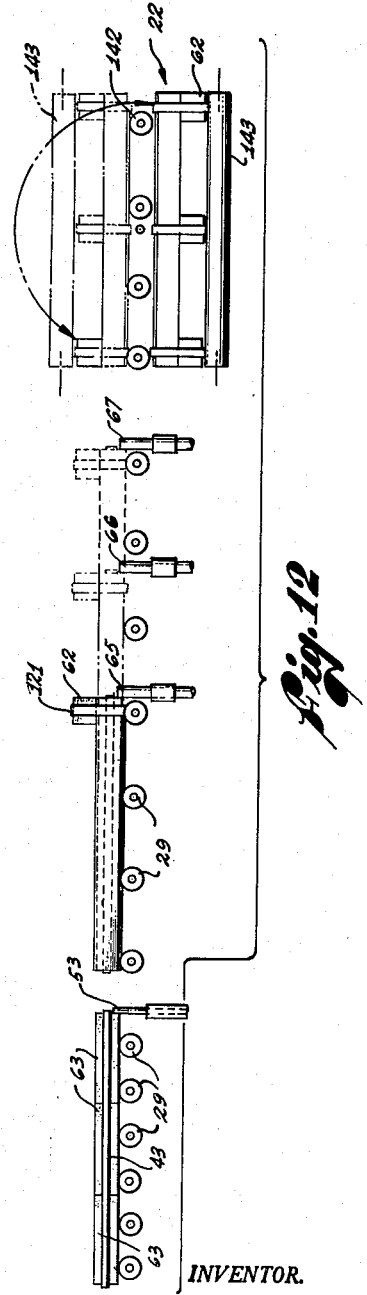

United States Patent Office 3,147,692
Patented Sept. 8, 1964

3,147,692
METHOD AND APPARATUS FOR MAKING
PALLETS
Roland A. Berner, Altadena, Calif., assignor to Ceramic
Combustion and Engineering Company, a corporation
of California
Filed July 17, 1961, Ser. No. 124,653
13 Claims. (Cl. 100—2)

The present invention relates generally to a method of and apparatus for making pallets for supporting load units, and more particularly to the construction of pallets made up of a plurality of the load units which they are adapted to support. A particularly useful application of the invention is in connection with the building industry, where bricks or building blocks represent the load units, and the invention has been so shown; but this is not to be taken as limitative on the claims.

Some years ago it was common practice for brick manufacturers to deliver bricks to a job site by loading them at random into the body of a dump truck, and then dumping them from the truck onto the ground at the site. This resulted in breaking or chipping a considerable number of bricks, besides leaving them in an inconvenient and unorderly arrangement. Alternatively, the bricks were loaded and unloaded by hand, which was a very expensive operation.

A significant improvement came about in recent years with the advent and subsequent wide-spread use by the industry of fork lifts for loading and unloading. In order to utilize the fork lifts for moving bricks, the bricks were necessarily stacked on pallets, usually constructed of wood or steel. Since the pallets represent a substantial investment to the manufacturer, they must be returned and resued many times to justify the investment. To insure that they are returned, the customer is normally charged a deposit, which is refunded when the pallets are returned. This procedure is inconvenient to both the customer and the manufacturer because of the records and finances involved, and even more so to the party who must dispatch a truck to return the pallets.

There is disclosed and claimed in my copending application for Pallet, Serial No. 12,726, filed March 4, 1960 (now Patent No. 3,077,982), a disposable pallet constructed largely of load units identical to the load units which are supported thereon, so that the load units of the pallet itself are usable, and therefore the pallet is a part of the useful load.

It is an object of the present invention to provide a method and apparatus for constructing disposable pallets made up of a plurality of usable load units.

Another object of the present invention is to provide an improved method and apparatus for constructing a disposable pallet made up of usable load units and providing a flat load-supporting surface and spaced load-supporting units therebeneath providing ready access for the fork of a lifting truck.

A further object of this invention is to provide a method and apparatus for constructing a pallet made up of a plurality of load units in which the units are secured together to form the pallet in upside down relation with the load unit runners on top and in which the pallet is then inverted to place the load-supporting surface of the pallet at the top.

A still further object of this invention is to provide a method and apparatus for constructing a disposable pallet for a plurality of load units in which the units are successively tied together at a plurality of stations along a conveyor system, inverted at a transfer station to place the load-supporting surface of the pallet at the top, and then delivered to a second conveyor system.

These and other objects and features of the invention will be readily apparent to those skilled in the art from the following specification and the appended drawings, in which:

FIGURE 7 is a longitudinal sectional view of the delivery portion of the apparatus showing the pallet in inverted position;

FIGURE 8 is a schematic wiring diagram of the control circuits for the pallet-inverting motor;

FIGURE 9 is an enlarged detail elevational view of the limit switch controlling the normal position of the pallet-inverting mechanism and taken in the direction of the arrow 9 of FIGURE 1;

FIGURE 10 is an enlarged elevational view showing the limit switch controlling the inverted position of the pallet-inverting mechanism taken at the opposite side of the apparatus and in the opposite direction to the arrow 9 of FIGURE 1;

FIGURE 11 is a top plan schematic reperesentation of the positions assumed by a pallet in its passage through the apparatus of this invention; and FIGURE 12 is a side elevational schematic representation similar to FIGURE 11.

Figure 1:
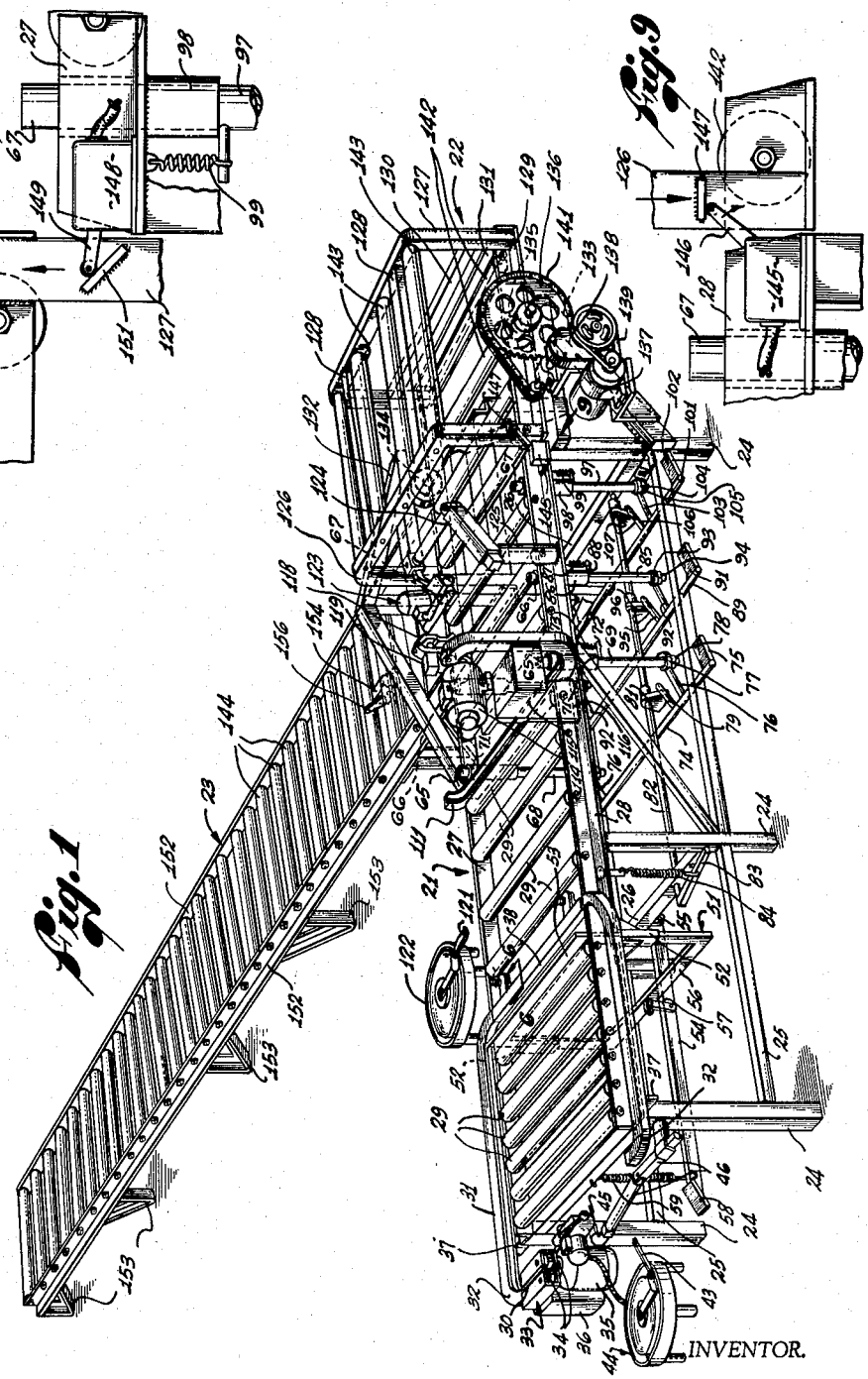
FIGURE 1 is a persepective view of a pallet-making apparatus according to the present invention.

The palletizing apparatus of the present invention, as illustrated in FIGURE 1, comprises a construction roll table, indicated generally at 21; a pallet-inverting mechanism, indicated generally at 22; and a delivery roll platform, indicated generally at 23. The roll table 21 is formed upon a plurality of vertically extending, spaced legs 24 joined adjacent their lower ends by longitudinally extending bars 25 and cross struts 26. Upon the tops of the legs 24, at opposite sides of the roll table, are welded or otherwise secured L-shaped angles 27 and 28, between the upright legs of which are rotatably mounted rollers 29. The rollers 29 at the forward end of the roll table 21 are placed relatively closely together as the bricks are located thereon prior to the attachment of a horizontal binding strap thereabout. The rollers 29 may decrease in height from the forward to the rear end of the roll table 21, so that the pallets tend to move by gravity along the roll table.

A guide channel 31 for the horizontal, peripheral binding strap for the pallet is located at the forward end of the roll table 21, about the closely spaced rollers 29 thereat. The channel 31 is of general U-shape, with inwardly bent ends at 32. Upon one channel end 32 is mounted a strap-feeding device, indicated generally at 33, and including a pair of driving rollers 34 driven by a motor 35 whose operation is effected through a controller 36. The forward legs 24 on the roll table 21 support an angle 37 upon which the forward portion of the channel 31 is mounted. The rear portion of the channel 31 is supported on the horizontal legs of the angles 27 and 28, the vertical legs thereof being cut away to receive the channel below the level of the rollers 29. The bight of the U-shaped channel 31 is closed by an inverted angle 38 (FIG. 6) resiliently held in closed position by a spring 39 mounted about a headed pin 41 secured to an ear 42 on the channel 31. The binding strap to be located about the periphery of the pallet is indicated at 43, fed from a strap coil supporting stool 44. A cutting, tensioning, and crimping tool for the binding strap is indicated at 45 and is supported on a forward leg 24 of the roll table through an articulated arm system 46.

The first stop for the roll table is shown at 51 as a rectangular frame guided for vertical movement in sleeves 52 rigidly mounted on the opposite side angles 27 and 28 of the roll table. The rectangular frame 51 has an upper transverse strap 53 which in the upper position of the stop extends above the level of the rollers 29, in the path of the pallet bricks. To lower the stop 51, there is provided a longitudinally extending lever 54 pivotally mounted on a cross strut 26 at 55, and connected to the lower horizontal strap 56 of the stop 51 by a link 57. The end of the level 54 is provided with a footplate 58, and is biased upwardly by a spring 59, which normally holds the stop 51 in its upper, pallet-engaging position.

Figure 2:
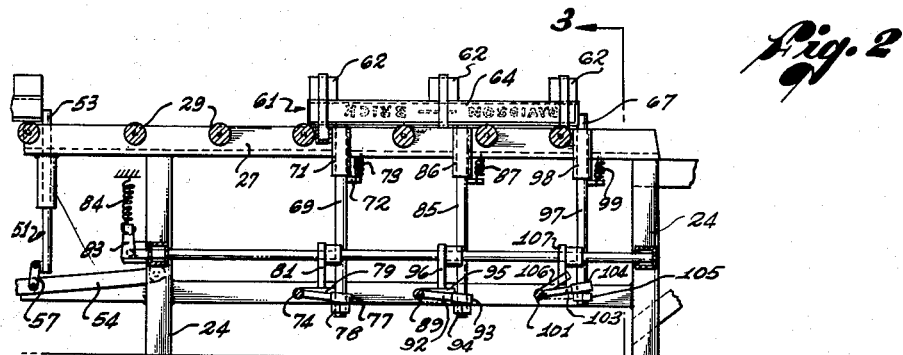
FIGURE 2 is a partial vertical sectional view through the pallet-making apparatus of FIGURE 1.
Figure 3:
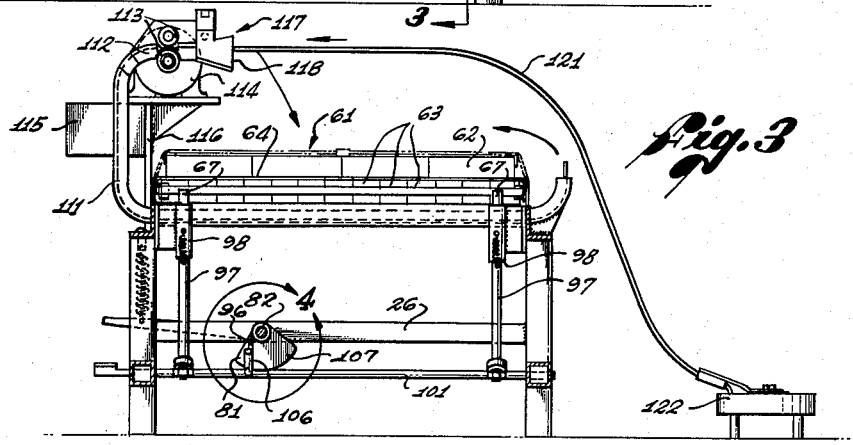
FIGURE 3 is a transverse sectional view on the line 3—3 of FIGURE 2.

Referring to FIGURES 2 and 3 of the drawings, it will be seen that the pallet, which is indicated generally at 61, is made up of a plurality of platform bricks, shown at 63 in FIGURE 3, and bound together by a peripheral strap. A sheet of corrugated cardboard 64 is preferably placed over the platform bricks and on top of the cardboard sheet are placed spaced rows of bricks 62, specifically shown as three, although two or any desired greater number of rows may be used.

The roll table 21 is provided with longitudinally spaced stops, the same in number as the number of rows 62 of supporting bricks and spaced in conformity with the spacing between the rows. In the drawings, three stops are shown, to conform to the three supporting rows of bricks 62, and designated 65, 66, and 67. Stop 65 comprises a pair of tubular members 68 and 69 at opposite sides of the roll table slidably received within sleeves 71 rigidly mounted on the opposite side angles 27 and 28. Each of the tubular members 68 and 69 is provided with a horizontal pin 72 extending therefrom, and springs 73 interconnect the pins 72 and the side angles 27 and 28 to bias the tubular members 68 and 69 upwardly so that the stop 65 is located in position to engage and index the pallet on the roll table. A transverse shaft is journaled in the opposite longitudinal bars 25 and is provided with a footplate 75 at one end. Rigid with the shaft 74 are a pair of arms 76 extending radially thereof and terminating in collars 77 disposed about the tubular members 68 and 69 and bearing against adjustable stop nuts 78 on the ends thereof. A third arm 79 extends from the shaft 74 and cooperates with the edge of a retaining cam 81, rigidly mounted on a longitudinally extending shaft 82 which is journaled in the cross struts 26. The shaft 82 terminates in an integral arm 83, biased upwardly by a spring 84.

The stop 66 comprises a pair of tubular members 85, slidably received within sleeves 86 rigidly mounted on the opposite side angles 27 and 28 and biased to upward position by springs 87 engaged with horizontally projecting pins 88. A shaft 89, having a footplate 91, is journaled in the opposite longitudinal bars 25 and is provided with a pair of transversely extending arms 92. The arms 92 terminate in collars 93 which engage adjustable stop nuts 94 on the ends of the tubular members 85. An arm 95 extends transversely of the shaft 89 and cooperates with the edge of a retaining cam 96 on the shaft 82.

The stop 67 is comprised of a pair of tubular members 97 slidably received within sleeves 98 rigidly mounted upon the opposite side angles 27 and 28. The tubular members 97 are biased upwardly by springs 99. A shaft 101, having a footplate 102, is journaled in the opposite longitudinal bars 25. A pair of arms 103 project radially from the shaft 101 and terminate in collars 104 bearing against stop nuts 105 at the ends of the tubular members 97. A transverse arm 106 on the shaft 101 cooperates with the edge of a retaining cam 107 mounted on the shaft 82.

Figure 4:
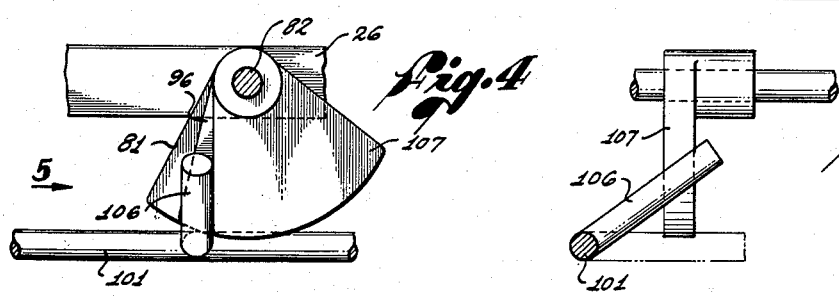
FIGURE 4 is an enlarged detail view of stop-retracting elements shown within the circle 4 of FIGURE 3.
Figure 5:
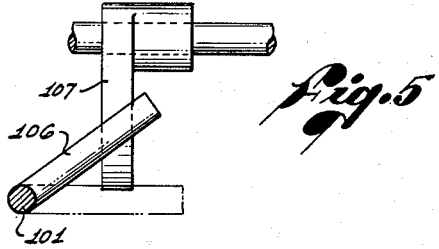
FIGURE 5 is a view of the stop-retracting elements taken in the direction of the arrow 5 in FIGURE 4.

The cams 81, 96, and 107 are angularly offset on the shaft 82, as shown in FIGURE 4, so that they cooperate successively with their respective arms 79, 95, and 106 in a step-by-step rotation of the shaft 82, this occurring as the transverse shafts 74, 89, and 101 are successively rotated in clockwise directions, as viewed in FIGURE 1. The arms and the cams thus cooperate in succession to retain their respective stops 65, 66, and 67 in their retracted or downward positions, permitting passage of the pallet thereover. As shown in FIGURES 2 through 5, the pallet is in the last stop position in engagement with stop 67, with stops 65 and 66 retracted by the lowering of their tubular members 68–69 and 85. In this position the shafts 74 and 89 are held rotated in the clockwise direction by the engagement of the lower surfaces of the cams 81 and 96 with the arms 79 and 95, respectively.

On the forward side of the stop 65 is located a strapping station for the spaced rows of brick to be mounted over the supporting platform of the pallet. At this station is mounted a guide channel 111 for the binding strap, generally L-shaped and having its lower leg supported on the horizontal legs of the side angles 27 and 28, the vertical legs thereof being notched to receive the guide channel which is thus located below the upper surfaces of the rollers 29. The vertical leg of the L-shaped channel is bent inwardly at 112, and is there provided with a pair of feed rollers 113 for feeding the binding strap through the channel. The drive rollers 113 are driven by a motor 114 under the control of a controller 115, the motor 114 and controller 115 being supported on a bracket 116 mounted on the side angle 28. In front of the rollers 113 and mounted on the channel end 112 is a guiding funnel 117 having a hingedly mounted side 118 controlled by a solenoid 119. The binding strap is shown at 121, fed from a reel-supporting stool 122. A cutting, tensioning, and crimping tool for the binding strap is indicated at 123 supported by articulated arms 124 on a post 125 mounted on the side angle 28.

The inverting mechanism 22 is made up of a pair of end U-shaped members 126 and 127, joined at their bights by struts 128, and with the ends of the legs joined at the sides by suitable angles 129 and at the back of an angle 131. Structural-supporting elements 132 and 133 are supported upon and extend rearwardly of the roll table 21, and the opposite side angles 129 of the inverting mechanism 122 are rigidly mounted upon shafts journaled in the structural elements 132 and 133 as at 134 and 135, respectively. Rigidly secured to the inverting mechanism 22 in axial alignment with its rotating axis is a sprocket 136 driven by a motor 137 through a gear-reduction mechanism 138, a belt drive 139 between the motor and the gear-reduction mechanism, and a chain drive 141 between the gear-reduction mechanism and the sprocket 136. The bottom of the rectangular frame of the inverting mechanism 22, as shown in FIGURE 1, is provided with rollers 142 parallel to the rollers 29 and forming a continuation thereof in the normal position of the inverting mechanism. The top of the inverting mechanism, as shown in FIGURE 1, is provided with rollers 143 rotatably mounted in the bights of the opposite U-shaped members 126 and 127. The rollers 143 are located at right angles to the rollers 142 and parallel to rollers 144 of the delivery platform 23, and form a continuation of the delivery platform when the frame of the inverting mechanism is in inverted position, as shown in FIGURE 7.

Supported on the side angle 28 adjacent the back end of the roll table 21 is a limit switch 145 (FIG. 9) having an operating arm 146 carrying an end roller engageable by an abutment plate 147 mounted on a leg of the U-shaped member 126 of the frame of the inverting mechanism 22. A limit switch 148 is supported on the angle 27 adjacent the rear end of the opposite side of the roll table 21, and has an operating arm 149 engageable by an abutment plate 151 on a leg of the U-shaped member 127 of the frame of the inverting mechanism 22.

The delivery roll platform 23 is disposed at right angles to the construction roll table 21 so that delivery of the completed pallets will be along the axes of the runners or rows of supporting bricks 62 beneath the pallet. The roll platform 23 is made up of opposite side angles 152 supported upon legs 153 and having rotatably mounted therein the rollers 144. The rollers 144 may be of slightly decreasing height along the platform so that the pallets will move therealong under the action of gravity. An electric switch 154 is mounted upon a cross strap 155 extending between the side angles 152, and has an arm 156 thereon in the path of the pallets moving along the delivery platform 23 and in position to be actuated thereby.

The wiring diagram for the pallet-reversing mechanism 22 is shown in FIGURE 8. The motor 137 is fed from 3-phase supply lines 161, 162, and 163 through either of a pair of contactors 164 and 165 having operating coils 166 and 167, respectively. Contactor 165 energizes the motor 137 for rotation in the pallet-inverting direction, while contactor 164 energizes the motor 137 for rotation to the return position after the pallet has been delivered to the delivery roll platform. Operating coil 167 of the contactor 165 is energized across lines 162, 163 through a pushbutton switch 168 in series with the limit switch 148 and the normally closed contacts of a relay 169 having an operating coil 171. Auxiliary contacts 172 on the contactor 165 provide a holding circuit in parallel with the pushbutton switch 168. The operating coil 166 of the contactor 164 is energized across lines 162 and 163 through limit switch 145 and pallet-actuated switch 154 in series. Auxiliary contacts 173 on the contactor 164 provide a parallel holding circuit about the switch 154.

Figure 6:
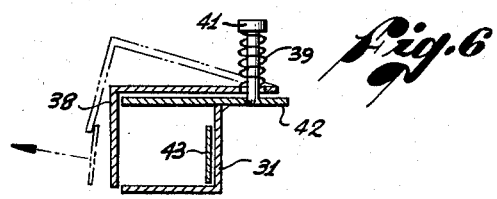
FIGURE 6 is an enlarged detail sectional view of the strap-guiding channel taken on the line 6—6 of FIGURE 1.

The operation of the apparatus and the carrying out of the method of the present invention will now be described. The platform load units or bricks for the pallet are first loaded on the closely spaced rollers 29 at the forward end of the roll table 21 in the manner shown at the extreme left of FIGURES 11 and 12. The bricks are prevented from moving along the roll table by the upper strap 53 on the stop 51, which engages the right-hand edge of the brick assembly as shown in FIGURES 11 and 12. The binding strap 43 is now fed to the feed rollers 34 with the motor 35 energized to drive the rollers. This feeds the binding strap through the channel 31 until the end of the strap becomes accessible at the opposite end of the guide channel 31. To pull the binding strap 43 inwardly out of the guiding channel 31 it is first slid edgewise upwardly out from between the rollers 34 through the slot 30, shown in FIGURE 1. The inward movement of the strap 43 results in tilting of the channel-closing angle 38, as shown in FIGURE 6, and thereafter the binding strap is free to be brought into engagement with the periphery of the brick assembly. The strap 43 is then engaged in the cutting, tensioning, and crimping tool 45, of known construction, and this is operated to cut the strap and crimp the ends thereof tightly together as at 40 in FIGURE 11. This tightening of the strap 43 binds the platform formed by the assembly of the bricks 63 into a stable platform both horizontally and vertically, since the individual load units or bricks are prevented from moving horizontally relative to each other by the strap 43, and from moving vertically relative to each other by the frictional engagement of their adjacent lateral surfaces. Prior to final tightening of the strap 43, small pieces of corrugated cardboard may be placed at the four corners of the assembly beneath the strap to prevent cutting of the corner bricks, as explained in my above-identified application for Pallet, Serial No. 12,726, now Patent No. 3,077,982.

At this time, the protective and brick-supporting corrugated cardboard sheet 64 may be placed on the brick assembly forming the pallet platform, and the rows of bricks 62 located in laterally spaced positions thereon to form the runners for the pallet; or, alternatively, the rows of bricks 62 forming the runners for the pallet may be placed on the platform each row individually at the strapping station as the pallet is successively indexed with the strapping station.

The lever 54 is now moved downwardly by stepping on the footplate 58, and this lowers the stop 51 to remove the strap 53 from its interfering position with respect to the pallet. The pallet may then be pushed along, or permitted to move by gravity, to the second stop position where the edge of the platform assembly is in engagement with stop 65, in the full-line position of FIGURES 11 and 12. The binding strap 121 is now fed through the guiding funnel 117 into engagement with the driving rollers 113 which are rotated through energization of the motor 114 to hold the hinge side 118 of the funnel guide 117 in closed position. After the desired length of the binding strap has been fed through the guiding channel 111, the motor 114 and the solenoid 119 are de-energized, and the strap 121 removed in an edgewise direction from between the rollers 113, the side 118 swinging freely open to permit this edgewise movement of the strap. The length of the strap is then constricted to remove it from the channel 111, and it is engaged with the cutting, tensioning, and crimping tool 123 to tightly bind the strap 121 about both the bricks 62 and the platform bricks 63 as shown at the right-hand side of the middle full-line pallet of FIGURES 11 and 12, the strap-end engaging and crimping being shown at 60.

The shaft 74 is now rotated by stepping on the footplate 75, and this lowers the tubular members 68 and 69 by engagement of the collars 77 at the ends of the arms 76 with the stop nuts 78. This moves the stop 65 out of interfering position with the pallet platform and permits it to be moved into the third stop position where the edge of the platform engages the stop 66. With this rotation of shaft 82 and cam 81, the edge of the cam 81 is placed above the arm 79 and prevents return rotation of the shaft 74 so that the tubular members 68 and 69 are held downwardly with the stop 65 in its lowered, inoperative position. With the pallet platform engaging stop 66, the central row of bricks 62 forming the central runner to support the pallet platform is indexed with the strapping station, and this central row of bricks is bound together and to the platform bricks by a strap 121 in the same manner as just described for the right-hand row of bricks in the second stop position.

When the central row of bricks has been strapped to the pallet platform bricks, the shaft 81 is rotated by stepping on the footplate 91, to pull the tubular members 85 downwardly by the engagement of the collars 93 at the ends of the arms 92 with the stop nuts 94. This lowers the stop 66 to inoperative position, freeing the pallet platform for movement along the roll table to the fourth stop position, where the edge of the platform engages the stop 67. With the rotation of the shaft 89, the arm 95 frees the cam 96 so that the shaft 82 again has an increment of rotation until the cam 107 engages the arm 106, this being the position of the parts as shown in FIGURES 2 through 5. The rotation of the shaft 82 moves the cam 96 above the arm 95 and prevents return rotation of the shaft 89 so that the tubular members 85 are held depressed with the stop 66 in inoperative position. With the pallet platform now in the fourth stop position, the farthest right-hand dotted position of FIGURES 11 and 12, the row of bricks 62 forming the left-hand runner of the pallet, as viewed in FIGURES 11 and 12, is now aligned with the strapping station, and this row of bricks is now strapped to the platform bricks by a strap 121 in the manner previously described for the strapping of the bricks at the right-hand runner of the pallet.

This completes the pallet and it is now moved into the frame of the inverting mechanism 22. This is accomplished by rotating the shaft 101 by stepping on the footplate 102 to move the tubular members 97 downwardly by engagement of collars 104 on the ends of arms 103 with stop nuts 105. This lowers the stop 67 to noninterfering position whereupon the pallet may be pushed or permitted to move by gravity from the roll table 21 onto the rolls 142 of the inverting mechanism. The pallet is stopped in this movement by engagement with a transverse strut 130 extending between the legs of the U-shaped member 127 of the frame of the inverting mechanism 22. To effect inverting of the pallet so that it is supported upon its runners formed by the spaced rows of bricks 62, with its load-supporting platform upwardly, the motor 137 may be automatically energized by the tripping of a switch within the inverting mechanism similar to the switch 154, by the riding of the pallet thereover; or the motor may be manually energized, the latter operation being shown, for simplicity's sake, in the diagram of FIGURE 8.

With the operation of pushbutton switch 168, the coil 167 is energized across lines 162 and 163 through the contacts of limit switch 148 and the normally closed contacts of relay 169. Contactor 165 now closes to energize the motor 137 for rotation in a direction to effect clockwise rotation of the invertitng mechanism 22, as viewed in FIGURES 1 and 12. Contacts 172 form a holding circuit about switch 168 and motor 137 continues to rotate the inverting mechanism through 180 degrees until abutment plate 151 engages the arm 149 to open the limit switch 148. This de-energizes coil 167 and drops out the contactor 165 to de-energize the motor 137. The parts are now in the position shown in FIGURE 7 and in full lines at the right-hand position of FIGURE 12, with the rollers 143 in alignment with the rollers 144 of the delivery roll platform 23 and the pallet now free to be pushed or moved by gravity onto the rolls of the delivery platform, from the full-line position of the pallet in FIGURE 7 into the phantom position thereof. As the pallet continues moving in the direction of the arrow beyond its phantom position of FIGURE 7, it will engage the arm 156 of switch 154 to effect closing movement thereof.

The closing of switch 154 will energize operating coil 166 across lines 162 and 163, through the now-closed contacts of the limit switch 145, which closed when the inverting mechanism started its rotation to inverted position, at which time the abutment plate 147 moved out of engagement with the operating arm 146 of the limit switch 145. The contactor 164 now closes to energize the motor 137 for rotation in reverse direction to return the inverting mechanism to its original position, with the rollers 142 aligned wtih the rollers 29 of the roll table 21. Auxiliary contacts 173 close to place a parallel holding circuit across the contacts of switch 154, so that the motor 137 remains energized after the switch 154 moves open when released by the pallet. This energization continues until limit switch 145 is opened by the re-engagement of abutment plate 147 with switch-operating arm 146, which occurs in the returned position of the inverting mechanism, as in, FIGURE 1. While either switch 154 or auxiliary contacts 173 are closed, the contacts of relay 169 will be opened by energization of its coil 171 across lines 162, 163. This prevents operation of the contactor 165 while the contactor 164 is energized, and also prevents operation of the contactor 165 to invert the pallet-inverting mechanism while the switch 154 is held closed by the location of a pallet thereover. The latter occurrence would indicate that the delivery roll platform is filled, and would prevent inversion of an additional pallet into the delivery position where it might not clear the inverting mechanism, or where other malfunction might result. In any event, the relay 169 prevents closing of the contactor 165 at any time while either switch 154 or auxiliary contacts 173 are closed. The completed pallets may be removed from the delivery roll platform 152 by a fork lift, and stored, or may immediately be placed on the ground or other surface for the loading of load units or bricks upon the load-supporting platform of the pallet.

At any time after the pallet leaves the construction roll table the stops 65, 66 and 67 can be returned to normal position by depressing the arm 83 to rotate the shaft 82 and the cams mounted thereon.

While the method and apparatus of this invention have been specifically illustrated in a sophisticated form calling for a plurality of stop positions where various operations are performed in the manufacture of a pallet; it will, of course, be understood that these operations may also take place while the pallet is held stationary at an inverting station similar to the inverting mechanism 22, wherein all operations may be performed. Thus the platform bricks may be assembled and bound together by a peripheral strap, the spaced rows of bricks assembled thereon to form support runners and tied to the platform bricks with vertical straps as herein described, all while the pallet is stationary, and then the finished pallet inverted to place the runners or supporting rows of brick beneath the load-supporting platform, platform, whence the finished pallet can be removed for storage or location at a loading station, supported on the spaced runner rows with the load-supporting surface upright for the assembly of load units or bricks thereon.

While the description of the method and operation of the device has been given with respect to the passage of a single pallet through the apparatus, it will be understood that while the vertical straps are being applied to the spaced runner rows of bricks at the stop positions, a second pallet platform can be assembled and bound by a peripheral strap by another workman at the initial station of the roll table; and that a number of pallets may be located at various stages of completion along the roll table, the inverting mechanism, and the delivery platform.

While certain preferred embodiments of the invention have been specifically shown and described, it will be understood that the invention is not limited thereto, as many variations will be apparent to those skilled in the art, and the invention is to be given its broadest interpretation within the terms of the following claims.

I claim:

1. The method of forming a disposable pallet from a plurality of usable individual load units which comprises: arranging a plurality of laterally contiguous load units to form a horizontal platform, with at least a portion of a lateral exterior surface of each of said units frictionally engaging at least one lateral exterior surface of another unit; binding said frictionally contacting surfaces in forceful, frictional engagement so as to provide said platform with structural rigidity; securing load units in spaced rows on top of said platform to provide spaced runners for supporting the platform; and inverting said platform and runners and disposing said runners upon a supporting surface so that said platform is horizontally located in spaced relation to said surface with said platform presenting an upper supprting surface for the stacking of load units thereon, which surface was the bottom surface of the platform during the construction of the pallet.

2. The method of forming a disposable pallet from a plurality of usable individual load units which comprises: arranging a plurality of laterally contiguous load units to form a horizontal platform, with at least a portion of a lateral exterior surface of each of said units frictionally contacting at least one lateral exterior surface of another unit; securing a horizontally extending tension band around the periphery of said platform, thereby pressing said frictionally contacting surfaces into forceful, frictional engagement so as to provide said platform with structural rigidity in all directions; binding other load units in spaced rows to the top of said platform to supply runners for supporting the platform; and inverting said platform and runners and disposing said runners on a supporting surface with said platform spaced from the surface by the thickness of the runners, and with said platform presenting an upper substantially horizontal surface for the stacking of load units thereon, which surface was the bottom surface of the platform during the construction of the pallet.

3. The method of forming a disposable pallet from a plurality of usable individual load units which comprises: arranging a plurality of laterally contiguous load units to form a horizontal platform with at least a portion of a lateral exterior surface of each of said units frictionally contacting at least one lateral exterior surface of another of said units; securing a horizontally extending tension band around the periphery of said platform and thereby pressing said frictionally contacting surfaces into forceful, frictional engagement so as to provide said platform with structural rigidity in all directions; placing a load unit supporting and protecting sheet of cardboard on said platform; placing spaced rows of load units upon said sheet; securing vertically extending tension bands about each of said rows of load units and said platform; inverting said platform and disposing said spaced rows of load units upon a supporting surface to serve as runners spacing said platform from said surface, the surface of said platform opposite to that on which said runners are secured presenting a substantially horizontally extending surface for the reception of additional load units disposed in stacked relation on said platform.

4. The method of forming a disposable pallet from a plurality of usable individual load units which comprises: arranging a plurality of laterally contiguous load units to form a horizontal platform with at least a portion of a lateral exterior surface of each of said units frictionally contacting at least one lateral exterior surface of another of said units; securing a horizontally extending tension band around the periphery of said platform and thereby pressing said frictionally contacting surfaces into forceful, frictional engagement so as to provide said platform with structural rigidity in all directions; placing a protective sheet over said platform; placing laterally spaced rows of load units upon said sheet; successively indexing said laterally spaced rows with a strapping station and applying vertically extending tension bands about said rows and platform at said station; inverting said platform and the rows of units thereon; and delivering said pallets with the platform supported on said spaced rows of units as runners spacing the platform from a supporting surface.

5. The method of forming a disposable pallet from a plurality of usable individual load units which comprises: arranging a plurality of laterally contiguous load units to form a horizontal platform with at least a portion of a lateral exterior surface of each of said units frictionally contacting at least one lateral exterior surface of another of said units; securing a horizontally extending tension band around the periphery of said platform and thereby pressing said frictionally contacting surfaces into forceful, frictional engagement so as to provide said platform with structural rigidity in all directions; placing a protective sheet over said platform; placing laterally spaced rows of load units upon said sheet; successively indexing said laterally spaced rows with a strapping station and applying vertically extending tension bands about said rows and platform at said station; inverting said platform and the rows of units thereon; delivering said pallets with the platform supported on said spaced rows of units as runners spacing the platform from a supporting surface; and changing the direction of movement of said pallet by 90 degrees after its inversion so that its motion thereafter is along the axes of said rows of load units.

6. Apparatus for forming a disposable pallet from a plurality of usable individual load units comprising: a table on which a plurality of laterally contiguous load units may be arranged to form a substantially horizontal platform; means for applying a horizontally extending tensioning strip about the periphery of said load units, the top of said platform formed by said load units being adapted to receive spaced rows of load units thereon; means for successively applying vertically extending tensioning bands about said rows of load units and the platform formed by said original laterally contiguous load units; and means for inverting said platform and rows of load units so that the pallet formed from said load units may be removed with said spaced rows of units beneath the platform in position to serve as runners spacing the platform from a supporting surface.

7. Apparatus for forming a disposable pallet from a plurality of usable individual load units comprising: a first table section for the support of a plurality of laterally contiguous load units arranged to form a substantially horizontal platform; means at said first table section for applying a horizontally extending tensioning band about the periphery of said load units; a second table section positioned adjacent to said first table section and having means for applying a vertically extending tensioning band; and means associated with said second table section for successively indexing said platform of load units along said second table section for the application of laterally spaced rows of load units and their securement to said platform by said vertically extending tensioning bands.

8. Apparatus for forming a disposable pallet from a plurality of usable individual load units comprising: a first table section for the support of a plurality of laterally contiguous load units arranged to form a substantially horizontal platform; means at said first table section for applying a horizontally extending tensioning band about the periphery of said load units; a second table section positioned adjacent to said first table section and having means for applying a vertically extending tensioning band; means associated with said second table section for successively indexing said platform of load units along said second table section for the application of laterally spaced rows of load units and their securement to said platform by said vertically extending tensioning bands; and a third table section including means for receiving and inverting said platform and the spaced rows of load units thereon so that the latter serve as runners to support the platform.

9. Apparatus for forming a disposable pallet from a plurality of usable individual load units comprising: a first table section for the support of a plurality of laterally contiguous load units arranged to form a substantially horizontal platform; means at said first table section for applying a horizontally extending tensioning strip about the periphery of said load units; a second table section positioned adjacent to said first table section and having means for applying a vertically extending tensioning band; means associated with said second table section for successively indexing said platform of load units along said second table section for the application of laterally spaced rows of load units and their securement to said platform by said vertically extending tensioning bands; a third table section including means for receiving and inverting said platform and the spaced rows of load units thereon so that the latter serve as runners to support the platform; and a fourth table section serving as a delivery means receiving said pallets from said inverting section.

10. Apparatus for forming a disposable pallet from a plurality of usable individual load units comprising: a construction roll table running in one direction from its forward to its rear end; a delivery roll platform extending from the rear end of said construction roll table in a direction at right angles to said one direction; means on said construction roll table for assembling a pallet made up of a platform of a plurality of load units having spaced rows of load units thereon; inverting means located adjacent to said construction roll table and said delivery roll platform to receive a pallet from the construction roll table and deliver it in inverted position and in a direction parallel to said delivery roll table; means for initiating pallet inverting operation of said inverting means; limit switch means for stopping said inverting means in either of its two positions for receipt or delivery of a pallet; and switch means associated with said delivery roll platform and engaged by the pallet for initiating automatic return of the inverting means to its original position.

11. Apparatus for forming a disposable pallet from a plurality of usable individual load units comprising: a construction roll table running in one direction from its forward to its rear end; a delivery roll platform extending from the rear end of said construction roll table in a direction at right angles to said one direction; means on said construction roll table for assembling a pallet made up of a platform of a plurality of load units having spaced rows of load units thereon; inverting means located adjacent to said construction roll table and said delivery roll platform to receive a pallet from the construction roll table and deliver it in inverted position and in a direction parallel to said delivery roll table; means for initiating pallet inverting operation of said inverting means; limit switch means for stopping said inverting means in either of its two positions for receipt or delivery of a pallet; switch means associated with said delivery roll platform and engaged by the pallet for initiating automatic return of the inverting means to its original position; and means for preventing a subsequent inversion of said inverting means while said pallet remains in contact with said switch means.

12. Apparatus for constructing a disposable pallet from a plurality of usable load units comprising: a construction roll table having a plurality of stop positions therealong; means for supporting a substantially horizontal platform of contiguous load units in front of the first stop position; means for applying a horizontally extending peripheral tension band to said platform in said first position; a second position along said construction roll platform having a vertical binding means thereat; stop means on said construction roll table successively indexing said pallet platform and laterally spaced rows of runner load units thereon with said vertical binding means so as to bind the pallet platform and the runners together; an inverting roll table at the end of said construction roll table for receiving and inverting said pallet, said inverting roll table including ceiling rollers at its top positioned at 90 degrees with relation to its pallet-receiving rollers so that when inverted said pallet is delivered in a direction at 90 degrees to the direction in which it is received; means for rotating said inverting roll table about a horizontal axis to and from inverted position; and a delivery roll platform aligned with said inverting roll table when it is in inverted position.

13. Apparatus for constructing a disposable pallet from a plurality of usable load units comprising: a construction roll table having a plurality of stop positions therealong; means for supporting a substantially horizontal platform of contiguous load units in front of the first stop position; means for applying a horizontally extending peripheral tension band to said platform in said first position; a second position along said construction roll platform having a vertical binding means thereat; stop means on said construction roll table successively indexing said pallet platform and laterally spaced rows of runner load units thereon with said vertical binding means so as to bind the pallet platform and the runners together; an inverting roll table at the end of said construction roll table for receiving and inverting said pallet, said inverting roll table including ceiling rollers at its top positioned at 90 degrees with relation to its pallet-receiving rollers so that when inverted said pallet is delivered in a direction at 90 degrees to the direction in which it is received; means for rotating said inverting roll table about a horizontal axis to and from inverted position; a delivery roll platform aligned with said inverting roll table when it is in inverted position; and means engageable by said pallet in its movement for controlling an operation of said inverting roll table.

References Cited in the file of this patent

UNITED STATES PATENTS

| | | |
|---|---|---|
| 2,176,385 | Walper | Oct. 17, 1939 |
| 2,630,214 | Reed | Mar. 3, 1953 |
| 2,632,381 | Buckland | Mar. 24, 1953 |
| 2,664,813 | Rose | Jan. 5, 1954 |
| 2,725,137 | Muddiman | Nov. 29, 1955 |
| 2,769,557 | Ohr | Nov. 6, 1956 |
| 2,844,091 | Shafer et al. | July 22, 1958 |
| 2,867,166 | Saxton et al. | Jan. 6, 1959 |
| 2,896,207 | Wilson | July 21, 1959 |
| 2,908,121 | Enos | Oct. 13, 1959 |
| 2,917,991 | Segur | Dec. 22, 1959 |
| 2,961,810 | Johnson et al. | Nov. 29, 1960 |
| 3,003,296 | Feldkamp et al. | Oct. 10, 1961 |
| 3,012,497 | Fryer | Dec. 12, 1961 |
| 3,031,816 | Mertens | May 1, 1962 |

FOREIGN PATENTS

| | | |
|---|---|---|
| 340,439 | Great Britain | Jan. 1, 1931 |
| 677,751 | Great Britain | Aug. 20, 1952 |